United States Patent [19]

Langen

[11] Patent Number: 4,636,366

[45] Date of Patent: Jan. 13, 1987

[54] DEVICE FOR STERILIZNG HOLDERS CONTAINING PRODUCTS

[75] Inventor: Hermann J. Langen, Berkel Enschot, Netherlands

[73] Assignee: Machinefabriek Lan B.V., Tilberg, Netherlands

[21] Appl. No.: 283,922

[22] Filed: Jul. 17, 1981

[30] Foreign Application Priority Data

Jul. 19, 1980 [NL] Netherlands ........................ 8004172
Mar. 3, 1981 [NL] Netherlands ........................ 8101368

[51] Int. Cl.$^4$ ............................ A61L 2/00; A23L 3/04
[52] U.S. Cl. ................................... 422/297; 422/304; 99/362; 99/368; 99/369; 99/483
[58] Field of Search ................ 422/297, 302, 304, 25, 422/33, 38; 99/483, 361, 362, 364, 368

[56] References Cited

U.S. PATENT DOCUMENTS

| | | | |
|---|---|---|---|
| 2,642,795 | 6/1953 | Bingham | 99/361 |
| 2,660,512 | 11/1953 | Webster | 422/304 X |
| 2,789,795 | 4/1957 | DeBack et al. | 99/361 X |
| 3,101,995 | 8/1963 | Beauvais | 422/297 |
| 3,418,918 | 12/1968 | Beauvais et al. | 99/362 |
| 3,566,775 | 3/1971 | Mencacci | 99/362 |
| 3,584,569 | 6/1971 | Wieser et al. | 99/361 |
| 3,619,126 | 11/1971 | Carvallo | 422/38 X |
| 3,774,524 | 11/1973 | Howard | 99/483 |
| 3,793,939 | 2/1974 | Wieser et al. | 99/361 X |
| 3,972,679 | 8/1976 | Ruig | 422/304 X |
| 3,986,832 | 10/1976 | Smorenburg | 422/304 X |
| 4,058,364 | 11/1977 | Terumoto | 422/198 |
| 4,263,254 | 4/1981 | Huling | 422/304 X |
| 4,279,858 | 7/1981 | Huling | 422/304 X |

FOREIGN PATENT DOCUMENTS

539104 7/1955 Belgium .
1278910 11/1961 France ........................... 422/304
497489 12/1938 United Kingdom .

Primary Examiner—David L. Lacey
Attorney, Agent, or Firm—Oblon, Fisher, Spivak, McClelland & Maier

[57] ABSTRACT

A device for sterilizing holders containing products with the aid of heated fluid in a device receiving the holders, whereby the holders are continuously passed through an elongate passage across the device and the fluid is introduced while pressure into the passage at a feeding point located between the ends of the elongate passage and is allowed to escape near the two ends of the passage while causing the pressure of the fluid during its flow to progressively decrease from the feeding point to the ends of the passage.

13 Claims, 10 Drawing Figures

DEVICE FOR STERILIZNG HOLDERS CONTAINING PRODUCTS

BACKGROUND OF THE INVENTION

Field of the Invention

The invention relates to a method of sterilizing product containers with the aid of heated fluid in a device receiving the containers.

The invention has for its object to provide a method in which continuous sterilization of the containers can be carried out in a simple manner.

According to the invention this can be achieved by continuously passing the holders in an elongate passage through the device, the fluid being supplied under pressure at a feeding point located between the ends of the elongate passage and being allowed to escape near the two ends of the passage, whilst provoking a gradual decrease in pressure of the fluid during its flow from the feeding point towards the ends of the passage.

By using the method embodying the invention an effective sterilization of the holders with their contents can be carried out in a simple manner, in which the holders with the products contained therein will first be gradually heated and subsequently gradually cooled during the movement through the passage.

According to a further aspect of the invention a device particularly suitable for carrying out the method according to the invention can be obtained by providing it with an elongate, box-shaped channel, with means for displacing the objects to the sterilized through the channel and with means for feeding pressurized fluid to the channel at a point located between the ends thereof.

In this way a device of simple construction and of high working capacity can be obtained.

According to a further aspect of the invention several box-shaped channels are arranged side by side. The heat supplied by the fluid can thus be more effectively used so that energy can be saved. The invention will be described more fully hereinafter with reference to an embodiment of a device in accordance with the invention schematically illustrated in the accompanying figures.

The device of the present invention also comprises ducts for supplying heated liquid into the channel at the feeding point located between the ends of the channel, whilst at regular distances from each other there have been fixed blades to the endless conveyor means, said blades closing almost the entirely of the cross-section of the hollow channel in such a way that, during operation the pressure of the liquid will progressively decrease from said feeding point to the ends of the passage.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DETAILED DESCRIPTION OF THE PREFERRED EMBODIMENTS

Figure 1:
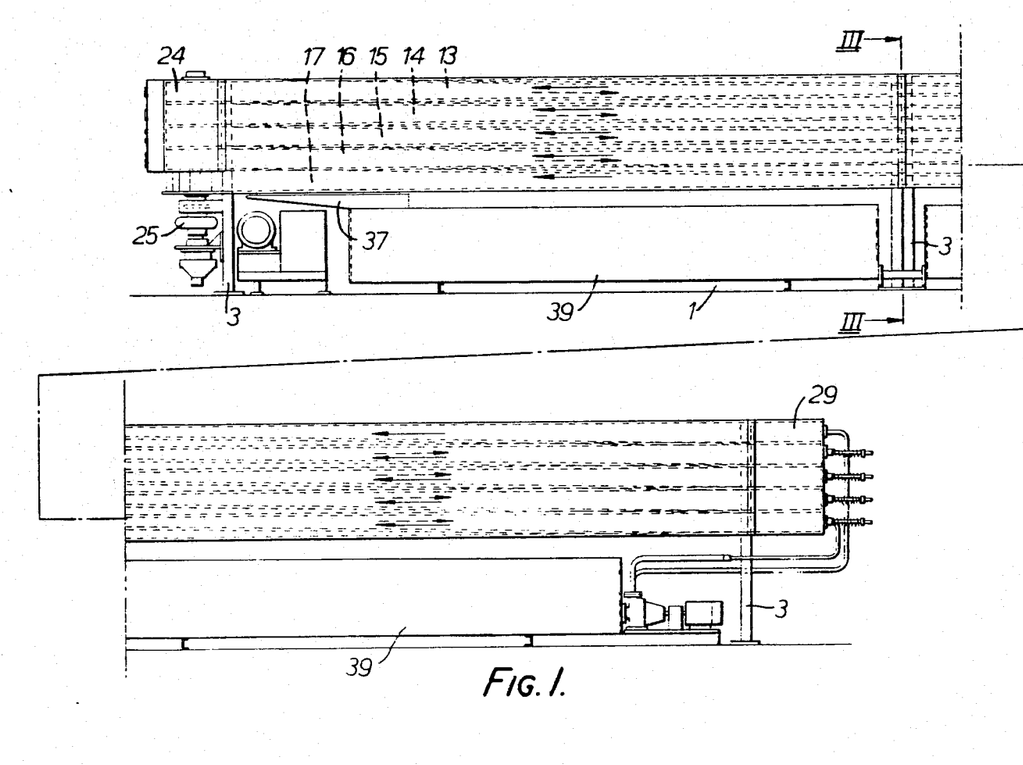
FIG. 1 is a schematic side elevational view of an embodiment of a device in accordance with the invention.
Figure 2:
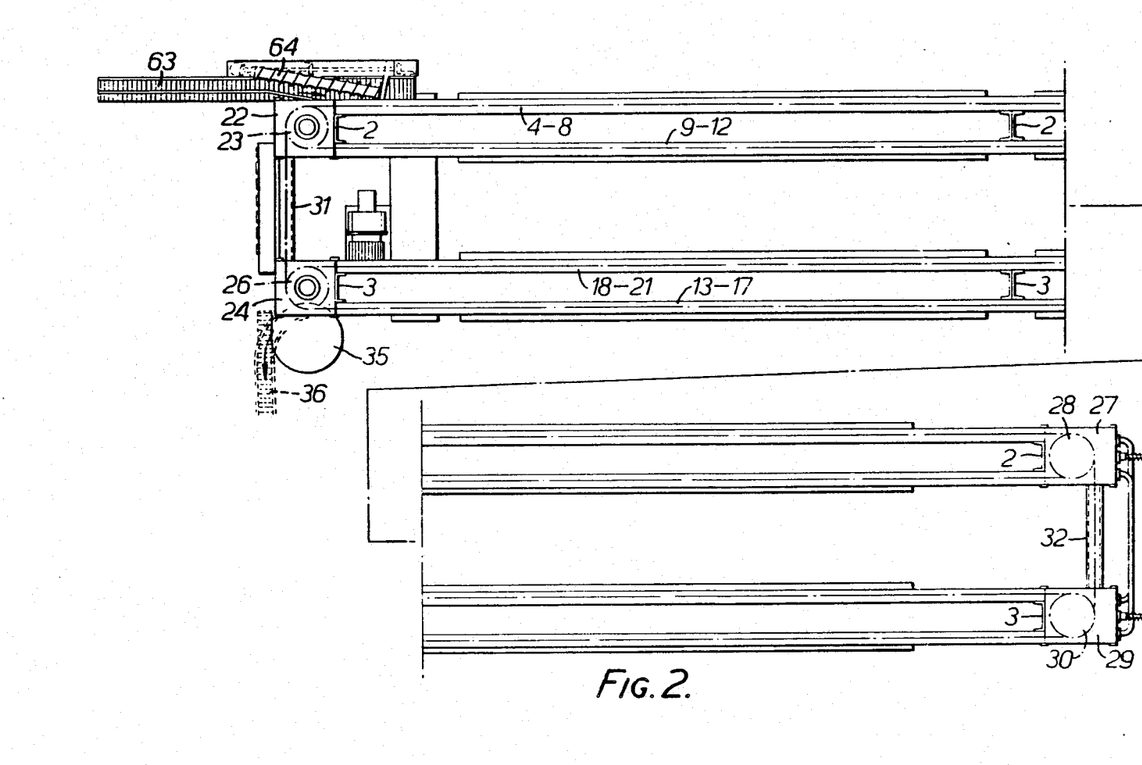
FIG. 2 is a schematic plan view of the device of FIG. 1.
Figure 3:
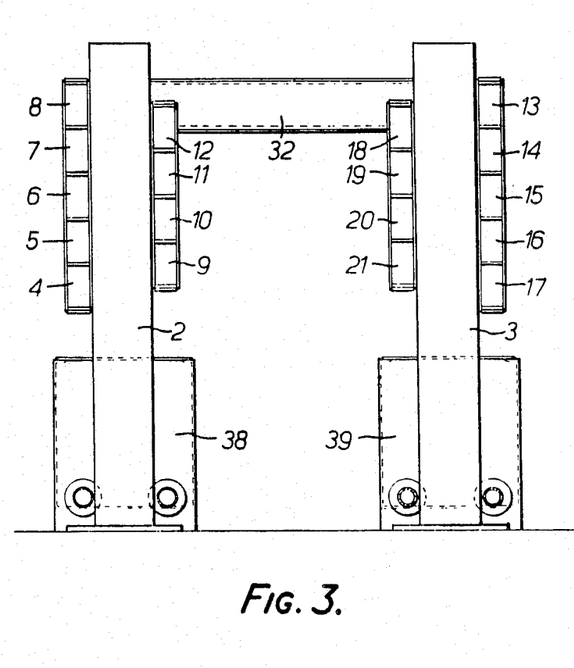
FIG. 3 is an enlarged sectional view of the device of FIG. 1 taken on the line III—III in FIG. 1.

The device shown in FIGS. 1 to 3 comprises a frame having horizontal frame beams 1 lying on the ground and vertical columns 2 and 3. The columns 2 arranged one behind the other in the direction of length of the device and disposed on the left-hand side of the device as viewed in FIG. 3 support on their sides remote from the columns 3 a plurality of superjacent rectangle-section cylinders 4 to 8 and on the sides facing the columns 3 a plurality of identical cylinders 9 to 12. In a similar manner the columns 3 support on their sides remote from the columns 2 a plurality of superjacent cylinders 13 to 17 and on their sides facing the columns 2 a plurality of superjacent cylinders 18 to 21. As will be apparent from FIG. 3, the disposition is such that the cylinders 9 to 12 located on one side of the columns 2 are offset in a direction of height with respect to the cylinders 4 to 8 on the other side, that is to say, by a distance substantially equal to about half the height of a cylinder. In a similar manner the cylinders 18 to 21 are offset with respect to the cylinders 13 to 17.

Near one end of the device the ends of the cylinders 4 to 12 join a cabinet 22 in which is located a drum 23 to be driven about a vertical axis. In a similar manner the ends of the cylinders 13 to 21 join at one end of the device a cabinet 24 in which is arranged a drum 26 rotatable about a vertical axis and driven by a driving member 25. Near the other end of the device the cylinders 4 to 12 join a cabinet 27 in which a reversing drum 28 is rotatable about a vertical rotary axis. At this end of the device the cylinders 13 to 21 join a cabinet 29 also accommodating a reversing drum 30 rotatable about a vertical rotary axis. The two cabinets 22 and 24 communicate with one another through a cylinder 31 and the two cabinets 27 and 29 communicate with one another with the aid of a cylinder 32.

As a matter of course, the cabinets 22, 24, 27 and 29 are provided at appropriate places with more or less horizontal separation partitions in order to avoid an undesirable short circuit between the superposed cylinders.

Figure 4:
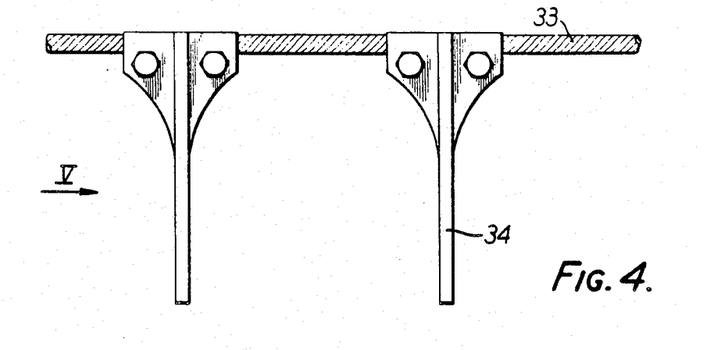
FIG. 4 is a plan view of a transport chain for displacing the holders.
Figure 5:
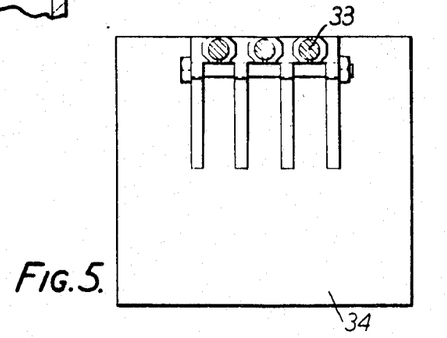
FIG. 5 is an elevational view of FIG. 4 in the direction of the arrow V in FIG. 4.

Through the various cylinders and cabinets mentioned above is passed an endless transport member, which is formed in this embodiment, as is shown in FIGS. 4 and 5, by three endless steel cables 35 extending in adjacent positions through the cylinders and cabinets, to which blades 34 at right angles to the direction of length of the cables are fastened at equal intervals. The dimensions of the blades 34 are chosen so that they are only slightly smaller than the surface of the internal cross-section of the cylinders 8 to 21. In practice it has been found to be effective to leave around the blade 34 a gap of a width of about 2 mms when the blade 34 is located in the hollow beam. It will be obvious that the transport member formed by the cables 33 with the blades 34 fastened thereto is passed around the drums 23, 26, 28 and 29 so that starting at the cylinder 4 the transport member extends from the cabinet 22 through the cylinder 4 to the rear, is passed around the drum 28., extends through the cylinder 9 to the front, is subsequently guided around the drum 23, extends through the cylinder 5 to the rear, is guided around the drum 28 and again extends through the cylinder 10 to the front and so on. The transport member then extends through the cylinder 8 to the rear and is subsequently passed around the drum 8 and through the cylinder 32 to the drum 30. From there the transport member extends through the passage 13 to the front, is passed around the drum 26, extends to the cylinder 18 to the front and so on until the transport member extends through the cylinder 17 to the front, is passed around the drum 26 and extends through the cylinder 31 and around the drum 23 to return in the cylinder 4.

Near the end of the cylinder 4 joining the cabinet 22 a transport belt 63 is arranged for the supply of the objects to be sterilized, for example, food-containing cans or ports. Near the end of the transport belt 33 joining the cylinder 4 a worm conveyor 64 is arranged for displacing the supplied objects transversely of the direction of length of the conveyor belt 33 through an opening (not shown) in the sidewall of the cylinder 4 so that during operation each time one of the objects to be sterilized in the cylinder 4 is placed between two consecutive blades 34 to be carried along by the transport member formed by the cables 33 and the blades 34 across the device.

At the cabinet 24 is arranged a pick-up mechanism 35 (not shown in detail) with the aid of which the objects supplied through the cylinder 17 by means of the transport member can be delivered to a conveyor belt 36.

Figure 6:
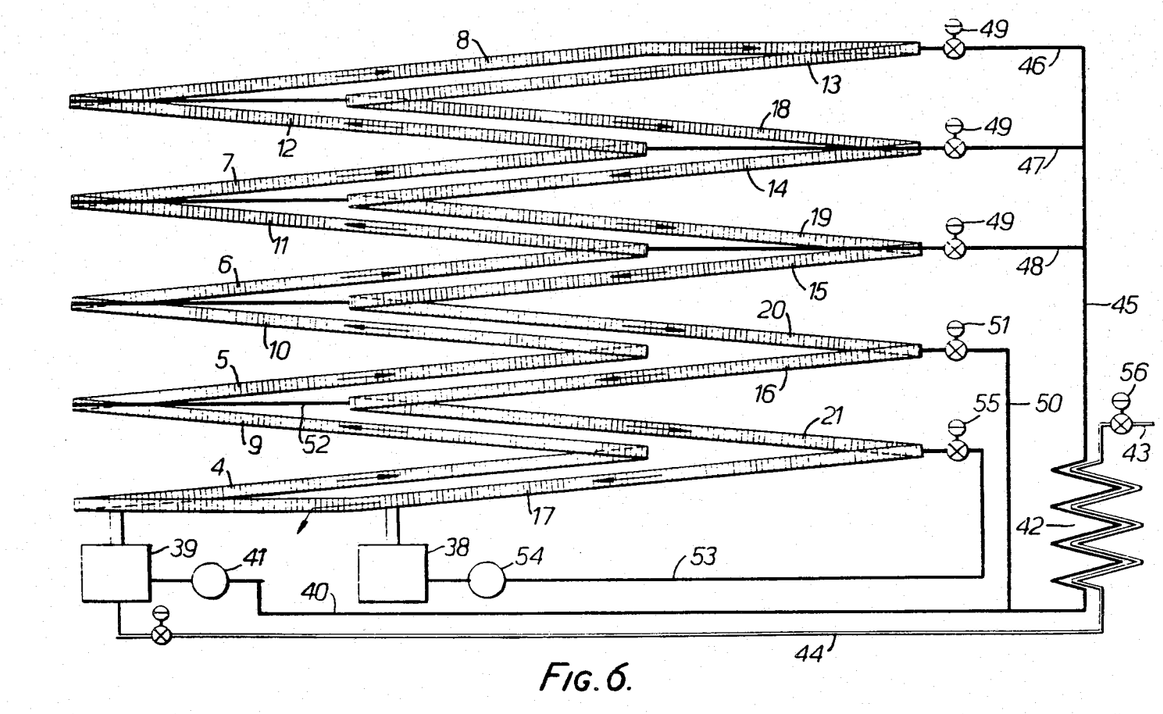
FIG. 6 is a schematic view of the device.

The parts of the cylinders 4 and 17 located near the cabinets 22 and 24 respectively are perforated and these perforated parts are located above collecting trays 37, which communicate with the storage tanks 38 and 39 respectively, which are arranged between the columns 2 and 3. Into the elongate channel or passage thus formed by the communicating cylinders can now be introduced pressurized fluid, preferably water at a feeding point spaced apart from the ends of said passage or elongate channel, said ends being formed by the ends of the cylinders 4 and 17 respectively joining the cabinets 22 and 24 respectively. FIG. 6 illustrates a schematic diagram of the device. From this Figure it will be apparent that a reservoir 39 has a duct 40 including a pump 41. The duct 40 communicates with a heat exchanger 42, to which from a duct 43 steam is supplied for heating the water emanating from the reservoir 39. The steam consumed in the heat exhanger is supplied through a duct 44 to the reservoir 39 for preheating the water contained therein. The water heated in the heat exchanger is conducted away through an outlet duct 45. The outlet duct 45 has branch ducts 46 to 48. The branch ducts include control-valves 49.

The branch duct 46 is connected with the passage formed by the cylinders at a feeding point located at the level of the topmost cylinders 8 to 13. The branch duct 47 communicates with the passage at the level of the lower cylinders 7, 12, 14 and 18. Finally the branch duct 48 communicates with the passage at a point located at the level of the cylinders 6, 11, 15 and 19.

In front of the heat exchanger the duct 40 has connected with it a duct 50. The duct 50 includes a control-valve 51. The duct 50 communicates with the passage formed by the cylinders at the level of the transition from the cylinder 20 to the cylinder 16. At the level of the transition between the cylinders 16 and 21 the passage communicates through a connecting duct 52 with a point of the passage located at the level of the transition from the cylinder 5 to the cylinder 9. Finally the reservoir 38 communicates through a duct 53 including a pump 54 with the passage at the level of the transition of the cylinder 21 to the cylinder 17. The duct 53 furthermore includes a controllable closing member 55. The supply of steam to the heat exchanger 42 from the duct 43 can be further controlled by means of a variable closing member 56.

As stated above, during the operation of the device objects to be sterilized such as tins or pots containing foodstuff are supplied to the device through the conveyor belt 63 and be carried along by the transport member formed by the steel cables 33 and the blades 34, the objects being first progressively passed through the cylinders 4 to 12, then through the cylinder 32, and subsequently through the cylinders 13 to 21 to be conducted out of the device near the end of the cylinder 17 at the cabinet 24. At the same time the elongate passage or the elongate hollow channel through which the objects are displaced is heated by pressurized fluid, preferably water at a pressure of about 2 atms. admitted through the duct 45 and the ducts 46 to 48. This water is sucked in from the reservoir 39 and passed through the heat exchanger 42, the water in the reservoir 39 being preheated by the steam consumed in the heat exchanger 42. The fluid supplied into the elongate passage will gradually flow toward the ends of the passage formed by the ends of the cylinders 4 and 17 located at the cabinets 22 and 24, where it will flow back through the perforations in the bottom into the reservoirs 38 and 39. Since the blades 34 have dimensions only slightly smaller than the internal cross-section of the passage, the fluid flowing from the feeding point towards the ends of the passage will encounter a given resistance, as a result of which the pressure of the fluid gradually decreases in the direction towards the outlet. From the flow diagram of FIG. 6 it will furthermore be apparent that in this embodiment cooling fluid can be introduced into the passage at a point located nearer the end of the passage than the feeding point(s) where the fluid heated by the heat exchanger is supplied. The water returning to the reservoir 38 is not prehaeated so that the temperature thereof will be comparatively low and, at will, fairly cold water can be supplied through the duct 53 to the passage at a point located comparatively close the outlet end of the passage so that the sterilized holders will not have an excessively high temperature when leaving the device.

By adjusting the closing members in the various ducts the variation of the pressure and the temperature of the elongate, hollow channel through which the holders to be sterilized are continuously passed can be controlled. Preferably this control is automatically carried out during operation by using sensors (not shown) of pressure and/or temperature, which apply signals to the various closing members through an appropriate control-device.

It will be obvious that during the displacement across the device the holders are gradually heated and subjected to higher pressure by the fluid flowing through the cylinders 4 to 12, whilst the temperature and the pressure to which the holders are exposed will gradually decrease during the movement of the holders through the cylinders 13 to 21.

Figure 7:
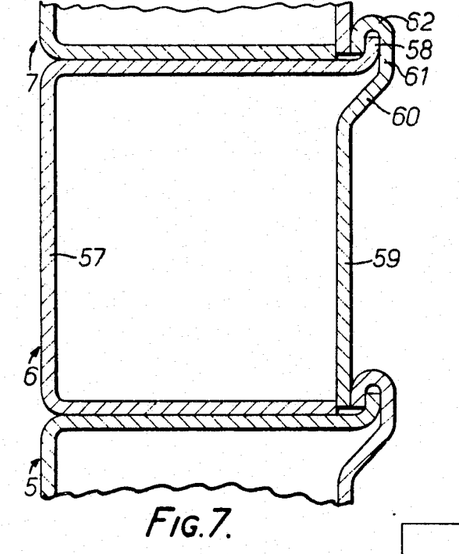
FIG. 7 is a schematic sectional view of a potential embodiment of the channels used in the device.

FIG. 7 shows a further suitable mode of manufacturing the cylinders. From this figure it will be seen that each cylinder is formed by a substantially channel-section beam 57, the upper flange of the two parallel flanges being slightly longer than the lower flange and having a rim 58 bent over through an angle of about 90°. In order to form a closed cylinder the open side of the channel-section beam is closed by a plate 59, which has at its top end an outwardly bent-over part 60, which terminates in a part 61 extending parallel to the plate 58, said part connecting the bent-over part 59 with an end 62 bent over in the form of a U. From the Figure it will be apparent that the U-shaped end 62 grips around the upwardly bent-over rim 58, whilst the U-shaped part 62 urges at the same time the lower side of the plate 59 of a higher cylinder against the end of the lower flange of the cylinder concerned. In order to have access to the interior of the cylinder it is only necessary to lift the plate 59 from the cylinder concerned.

Figure 8:
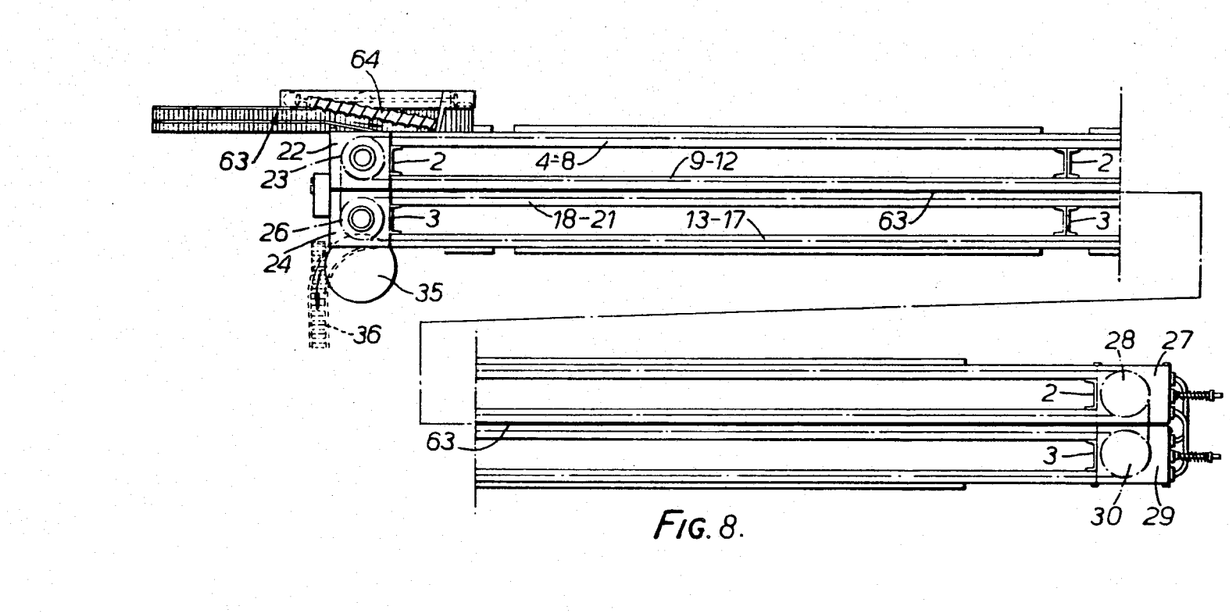
FIG. 8 is a schematic plan view of a second embodiment of a device in accordance with the invention.
Figure 9:
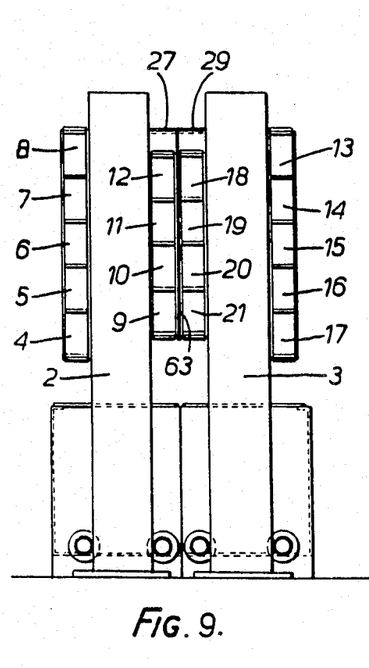
FIG. 9 is an enlarged cross-sectional view of FIG. 8.

The device shown in FIGS. 8 and 9 corresponds at least mainly with the device described above and corresponding parts are, therefore, designated by the same reference numerals. The cylinders 9 to 12 in this second embodiment are in contact with the cylinders 18 to 21 and the separating partition 63 between these cylinders has holes.

Figure 10:
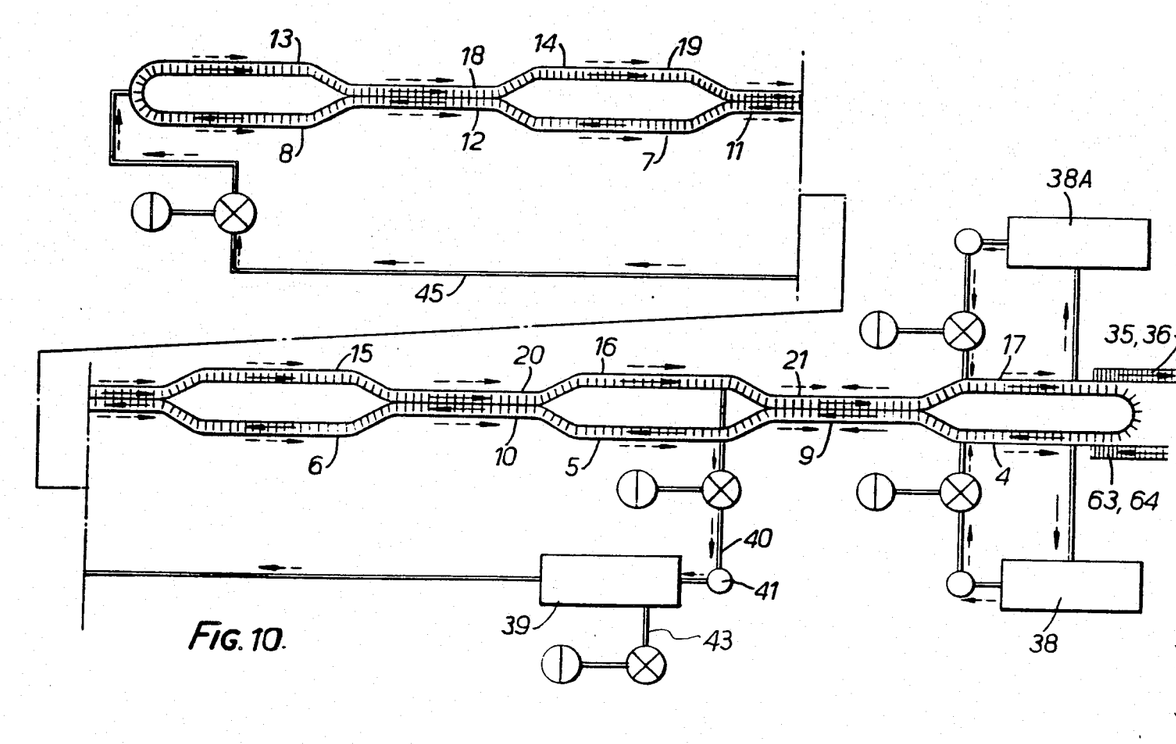
FIG. 10 schematically illustrates the course of the passage.

The parts of the cylinders 4, 5, 16 and 17 located near the cabinets 22 and 24 respectively have outlet orifices, the outlet orifices of the cylinders 4 and 17 communicating through collecting troughs 37 with storage tanks 38, 38A and the outlet orifices of the cylinders 5 and 16 communicate with a tank 39 (FIG. 10). Into the communicating cylinders forming the elongate, hollow channel or passage can be introduced pressurized fluid, preferably water at a supply point located at a distance from the ends of this passage or elongate, hollow channels, said ends being formed by the ends of the cylinders 4 and 17, respectively and which are connected with the cabinets 22 and 24 respectively. FIG. 10 shows a flow diagram of the fluid. From this Figure it will be seen that, for example, with the reservoir 39 is connected a duct 40 including a pump 41. From a duct 43 steam can be supplied to heat the water in the reservoir 39 at a temperature of, for example, 125° C. The hot water is conducted away through an outlet duct 45 to the passage formed by the cylinders at a point located at the level of the topmost cylinder 8 to 13. Through the reservoir 38, as is shown in FIG. 10, water of about 45° C. is displaced through the cylinder 4 and through the reservoir 38A water of about 20° is passed in a similar manner through the cylinder 17.

As stated above, during the operation of the device objects to be sterilized such as tins or pots containing, foodstuff or similar material are supplied via the conveyor belts 63 to the device and carried along by the transport member, the objects being first progressively passed through the cylinders 4 to 12, then through the cylinders 13 to 21 and near the end of the cylinder 17 near the cabinet 24 they are conducted out of the device. At the same time the elongate passage i.e. the elongate, hollow channel through which the objects are displaced is heated by pressurized fluid, preferably water, at a pressure of about 2 atms., admitted through the duct 45 from a reservoir 39. The fluid introcued into the elongate passage will progressively flow towards the ends of the passage formed by the ends of the cylinders 5 and 16 near the cabinets 22 and 24 and from there it will flow back into the reservoir 39. The objects are preheated in the cylinder 4 and cooled in the cylinder 17. By providing a pervious partition 63 between the adjacent cylinders 9 to 12 and 18 to 21 a satisfactory exchange of heat can take place between these cylinders.

During the displacement of the holders through the device they are also in this case gradually heated and subjected to a higher pressure by the fluid passing through the cylinders 4 to 12, whilst the temperature and the pressure to which the holders are subjected will progressively decrease during the movement of the holders through the cylinders 13 to 21.

Obviously, numerous modifications and variations of the present invention are possible in light of the above teachings. It is therefore to be understood that within the scope of the appended claims, the invention may be practiced otherwise than as specifically described herein.

I claim:

1. A device for sterilizing holders containing products with the aid of a heated liquid comprising:
   an elongate hollow channel;
   endless conveyor means for conveying the holders through said channel; and
   duct means for supplying a pressurized heated liquid into the channel at a feeding point located between end portions of said channel wherein said conveyor means further comprises a plurality of blades fixed thereto at regular intervals;
   said blades closing almost the entirety of a cross-section of the hollow channel throughout the length of said channel, such that during sterilizing operation the pressure of the liquid will progressively decrease from said feeding point to said end portions of said channel.

2. A device as claimed in claim 1, further comprising a plurality of cabinet members having reversing drums positioned therein wherein said channel further comprises a plurality of cylinders arranged above and beside one another, adjacent cylinders being offset in a height direction with respect to one another whilst end portions of said cylinders are connected with said cabinet members.

3. A device as claimed in claim 2, wherein said plurality of cylinders further comprise a first and second set of cylinders connected to said cabinet members and further comprising a connecting member interconnecting said cabinets with one another.

4. A device as claimed in claim 3, further comprising a holder supply device and a holder discharge device wherein a lowermost cylinder of said first set of cylinders is connected with said holder supply device and a lowermost cylinder of said second set of cylinders is connected with said holder discharge device.

5. A device as claimed in claim 4, further comprising outlet orifice means positioned adjacent said supply device and adjacent said discharge device, said lowermost cylinder having outlet orifices provided therein for fluid supplied thereto.

6. A device as claimed in claim 2, wherein said adjacent cylinders are in contact with one another over at least part of their lengths.

7. A device as claimed in claim 6, further comprising partition means impervious to said liquid positioned between said cylinders.

8. A device as claimed in claim 2, wherein each of said cylinders has a U-profile and which further comprises a releasable plate for closing an open side of said cylinders and which is held in place with the aid of said releasable plate of remaining cylinders of said plurality of cylinders.

9. A device as claimed in claim 1, wherein said conveyor means further comprises at least one endless cable having a catch member fastened thereto at equal intervals for displacing the holders.

10. A device as claimed in claim 9, wherein said catch member further comprises a blade.

11. A device as claimed in claim 1, further comprising means for supplying said liquid at a plurality of points along the length of said channel.

12. A device as claimed in claim 1, further comprising means for supplying cooling liquid positioned adjacent a discharge end portion of said channel.

13. A device as claimed in claim 1, wherein the conveyor means further comprises at least one chain having catch members fastened thereto at equal intervals for displacing the holders.

* * * * *

UNITED STATES PATENT AND TRADEMARK OFFICE
CERTIFICATE OF CORRECTION

PATENT NO. : 4,636,366
DATED : January 13, 1987
INVENTOR(S) : Hermann J. Langen

It is certified that error appears in the above-identified patent and that said Letters Patent is hereby corrected as shown below:

Title of invention should read

-- DEVICE FOR STERILIZING HOLDERS CONTAINING PRODUCTS --.

Signed and Sealed this

Fourteenth Day of April, 1987

Attest:

DONALD J. QUIGG

*Attesting Officer*　　　*Commissioner of Patents and Trademarks*